United States Patent
Allouche et al.

(10) Patent No.: US 11,770,297 B2
(45) Date of Patent: Sep. 26, 2023

(54) METHOD OF BUILDING A HYBRID QUANTUM-CLASSICAL COMPUTING NETWORK

(71) Applicant: BULL SAS, Les Clayes sous Bois (FR)

(72) Inventors: Cyril Allouche, Saint Arnoult en Yvelines (FR); Thomas Ayral, Versailles (FR); Simon Martiel, Versailles (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 17/941,603

(22) Filed: Sep. 9, 2022

(65) Prior Publication Data
US 2023/0083913 A1   Mar. 16, 2023

(30) Foreign Application Priority Data
Sep. 16, 2021   (EP) ..................... 21306280

(51) Int. Cl.
*G06N 10/80*   (2022.01)
*H04L 41/0806*   (2022.01)
(Continued)

(52) U.S. Cl.
CPC ......... *H04L 41/0809* (2013.01); *G06N 10/20* (2022.01); *G06N 10/60* (2022.01); *G06N 10/80* (2022.01)

(58) Field of Classification Search
CPC ........ G06N 10/20; G06N 10/60; G06N 10/80; H04L 41/0809; H04L 43/50;
(Continued)

(56) References Cited

U.S. PATENT DOCUMENTS

| | | | | |
|---|---|---|---|---|
| 6,011,830 A | * | 1/2000 | Sasin | .................... H04W 24/00 455/423 |
| 2005/0166080 A1 | * | 7/2005 | Volovoi | .................. G06F 30/22 714/1 |

(Continued)

OTHER PUBLICATIONS

European Search Report for corresponding EP Application No. 21306280.5, dated Mar. 15, 2022.
(Continued)

*Primary Examiner* — Le H Luu
(74) *Attorney, Agent, or Firm* — MEAGHER EMANUEL LAKS GOLDBERG & LIAO, LLP

(57) ABSTRACT

This invention relates to a method of building a hybrid quantum-classical computing network, comprising: a first step of transformation of an application composed of services into a Petri net including both Petri places (8, 9) and Petri transitions (81, 82, 91-94) between said Petri places (8, 9), any said Petri place (8, 9) corresponding to: either a first type building block corresponding to any quantum processing unit (8) which processes a job into a result, or a second type building block corresponding to any plugin unit (9), which converts a job into another job and/or a result into another result, any Petri transition (81, 82, 91-94) corresponding to any link between two building blocks (8, 9), all said links (81, 82, 91-94) being formatted so as to make any building block (8, 9) interchangeable, a second step of transformation of said Petri net into a hybrid quantum-classical computing network, replacing any building block by its corresponding unit (8, 9), interconnecting all said corresponding units (8, 9) together by replacing any Petri transition (81, 82, 91-94) by a connection simply transmitting without processing nor converting.

14 Claims, 3 Drawing Sheets

(51) Int. Cl.
 G06N 10/20 (2022.01)
 G06N 10/60 (2022.01)
(58) Field of Classification Search
 CPC ....... H04L 9/0852; F01D 21/14; G05B 17/02; G05B 19/41865; G06F 11/3457; G06F 30/18; G06F 30/22; G06F 8/10; G06Q 10/0633; G06Q 10/063; H04W 24/00
 See application file for complete search history.

(56) References Cited

U.S. PATENT DOCUMENTS

| | | | | |
|---|---|---|---|---|
| 2007/0052705 | A1* | 3/2007 | Oliveira | G06F 30/18 345/419 |
| 2007/0260390 | A1* | 11/2007 | Kim | F01D 21/14 701/100 |
| 2009/0235226 | A1* | 9/2009 | Murthy | G06F 8/10 717/104 |
| 2012/0041794 | A1* | 2/2012 | Lemcke | G06Q 10/063 705/7.11 |
| 2014/0188546 | A1* | 7/2014 | Goja | G06Q 10/0633 705/7.27 |
| 2015/0074256 | A1* | 3/2015 | Li | G06F 8/10 709/223 |
| 2018/0115492 | A1* | 4/2018 | Lessmann | H04L 43/50 |
| 2020/0242217 | A1* | 7/2020 | Durand | G06F 11/3457 |
| 2021/0365019 | A1* | 11/2021 | Van Beest | G05B 17/02 |
| 2022/0374002 | A1* | 11/2022 | Bär | G05B 19/41865 |
| 2022/0393863 | A1* | 12/2022 | Borrill | H04L 9/0852 |

OTHER PUBLICATIONS

Schmidt, H.W., "How to Bake Quantum into Your Pet Petri Nets and Have Your Net Theory Too", Symposium and Summer School on Service-Oriented Computing—SummerSOC 2021: Service-Oriented Computing, pp. 3-33; Communications in Computer and Information Science, vol. 1429, Springer.

European Search Report for corresponding EP Application No. 21306280, dated Mar. 15, 2022.

Schmidt, "How to Bake Quantum into Your Pet Petri Nets and Have Your Net Theory Too", arxiv.org, Cornell University Library, 201 Olin Library Cornell University, Ithaca, NY, 14853, pp. 1-15, Jul. 31, 2018.

* cited by examiner

METHOD OF BUILDING A HYBRID QUANTUM-CLASSICAL COMPUTING NETWORK

FIELD OF THE INVENTION

The invention relates to the technical field of methods of building a hybrid quantum-classical computing network.

BACKGROUND OF THE INVENTION

According to a prior art, for example in patent application EP 3602354, it is disclosed a simple hybrid architecture implementing the cooperation between a classical computing unit and a quantum computing unit. This simple hybrid architecture, cleverly structured, works very well. However, this is a very simple hybrid architecture. The specific interface linking the classical computing unit and the quantum computing unit would not be scalable to a complex network while keeping its whole efficiency.

Indeed, when a network becomes complex, because it comprises:
- hybrid technology, quantum and classical, widespread within the network,
- and/or heterogeneous technology, for example different technologies of quantum computing units and/or different technologies of classical computing units,
- and/or many calculation nodes, leading to a large sized network, even possibly to a high performance cluster (HPC), this complex network becomes harder and harder to build, requiring, more and more, a lot of time and many resources thereby also implying a lot of money, to achieve a complex network which is also performant.

Besides, since this complex, although performant, network is often rather intricate, whatever part of such network later needs to be improved, amended, or changed, usually it will be necessary to start all over again, from scratch, the whole network building process, thereby again losing time and money.

Not only is this complex network hard to build, but also hard to change, even if only a small part of it, whether hardware or software, so whether the change to be implemented deals with architecture or workflow. This low reusability of a built network is even more damageable than hardness to build the network from scratch for the first time.

SUMMARY OF THE INVENTION

The object of the present invention is to alleviate at least partly the above-mentioned drawbacks.

More particularly, the invention aims to provide for a rather simple and powerful network building method, with rather high reusability rate, especially in case of small changes within architecture or workflow, even if the network to build or to change is of a rather:
- hybrid nature, and even if of a hybrid nature widespread within the network,
- heterogeneous, and even if of a highly heterogeneous nature, with different quantum technologies and also possibly with different classical technologies,
- large scale, and even if with a very high number of calculation nodes, as can be for example a high performance cluster (HPC).

Therefore, in order to meet one or more of these goals, the best way possible according to Applicant's knowledge or at least notably better than existing prior art, the invention proposes a network building method which includes an intermediate and supplementary specific building step, along the transformation of an application composed of services into a hybrid quantum-classical computing network, which amounts to an intermediate step of transformation into a specific Petri net comprising two specific types Petri places and one specific type of Petri transition. Preferably, intermediate step of transformation into a specific Petri net comprises only two specific types Petri places and only one specific type of Petri transition.

It is especially and mainly this specific intermediate Petri transformation step which allows for making the network building method according to the invention, rather:
- simple and ergonomic (easier to run with similar efficiency level as other methods),
- powerful and efficient,
- reusable, or even highly reusable, in case of limited changes within the network,
- easily implementable within a large scale network, or even within a very large scale network.

This good compromise between global efficiency and global simplicity, comes especially from:
the specific building blocks chosen as Petri places, and all the more only two different types of them, improving universality of the building method,
the specific Petri transition with the specific format making differently structured building blocks interchangeable, and all the more only one type of it, which besides leads to a very simple second transformation step within the building method.

This object is achieved with a method of building a hybrid quantum-classical computing network, said network including network architecture and network workflow, comprising: a first step of transformation of an application composed of services into a Petri net including both Petri places and Petri transitions between said Petri places, any said Petri place corresponding to: either a first type building block corresponding to any quantum processing unit, said quantum processing unit including quantum processing hardware and quantum processing software, either digital or analog quantum processing unit, which processes a job received on an input port of said unit into a result sent on an output port of said unit, or a second type building block corresponding to any plugin unit, said plugin unit including plugin architecture and plugin workflow, which converts a job received on an input port of said unit into another job sent on an output port of said unit and/or a result received on another input port of said unit into another result sent on another output port of said unit, any Petri transition corresponding to any connection from an output port of any of said building blocks toward an input port of any other of said building blocks, all said output port(s) and said input port(s) being formatted so as to make any building block interchangeable with any replacing building block of different structure provided that said replacing building block has same format(s) at each of its input(s) and output(s) as the building block it replaces, a second step of transformation of said Petri net into a hybrid quantum-classical computing network, replacing any building block by its corresponding unit, interconnecting all said corresponding units together according to a topography of all said Petri transitions, by replacing any Petri transition by a connection simply transmitting without processing nor converting, from an output port of any of said units toward an input port of any other of said units, thereby getting said hybrid quantum-classical computing network.

Building the network is to be understood as physically manufacturing the network, and not only concepting a model of this network.

Building the network with the network including the network architecture is to be understood as physically manufacturing the network architecture, and not only concepting a model of this network architecture.

Building the network with the network including the network architecture and the network workflow is to be understood as physically manufacturing the network architecture and physically implementing the network workflow within the physically manufactured architecture, and not only concepting a model of this network workflow.

The network workflow is the enabling software framework related to the network architecture. The cooperation between network architecture (hardware) and network workflow (software) makes the network work properly.

A connection between a given output of a first building block and a given input of a second building block is typed, that means has a single and same type.

When interconnecting all the corresponding units (corresponding to building blocks) together according to a topography of all the Petri transitions, by replacing any Petri transition by a connection simply transmitting without processing nor converting, from an output port of any of these units toward an input port of any other of these units, thereby getting the hybrid quantum-classical computing network, not only are all these corresponding units interconnected together, but also all these corresponding units are orchestrated together, so as to be able to work properly as a network.

Despite using very simple Petri transition, which is a simple transmission without processing nor converting, efficiency can be kept at a high level, when all timing tasks and/or synchronization tasks within the network are managed by an orchestrator thereby warranting for a minimum delay and a lowered information loss. Indeed, because the timing tasks and/or synchronization tasks within the network would then be managed by the orchestrator, the Petri transition can thereby be kept very simple, indeed a simple transmission without processing nor converting is sufficient thereto, since this Petri transition does not need to manage this timing tasks and/or synchronization tasks of information circulation.

Embodiments of this invention enable to build a programmable heterogeneous hybrid quantum-classical computing system, with any number of quantum processors and with any type of classical computing solution, for example a single PC or an HPC cluster. The outcome is a programmable system that can execute any arbitrary computation workflow involving the underlying quantum and classical processors.

Embodiments of this invention provide for a kind of "universal scope" in the sense that it can integrate any kind of known quantum processor, namely analog gate based annealer, and can use them together with classical resources in a hybrid, heterogeneous computation workflow. Embodiments of this invention may include a programming API (Application Programming Interface) too. In particular, an API for the analog quantum computation. Embodiments of this invention may include an API and software layer of the interconnect between the different components.

Embodiments of this invention aim at building a hybrid quantum-classical computing network for applications composed of several services. Moreover, they enable to separate the deployment of these applications from their description, in the meaning that an application can be statically described, say on a laptop, and remotely deployed it on a distant machine, or on cluster of machines. To do so, an application composed of services will undergo a transformation through a specific intermediate Petri transformation step which allows for making the network building method according to embodiments of the invention, this specific intermediate Petri transformation step will encompass not only the application composed of services, but also the corresponding orchestration and deployment mechanisms.

Preferred embodiments comprise one or more of the following features, which can be taken separately or together, either in partial combination or in full combination.

Preferably, said second type building block corresponds to any plugin unit which converts a job received on an input port of said unit into another job sent on an output port of said unit and a result received on another input port of said unit into another result sent on another output port of said unit.

Hence, this second building block is more complete and offers more working capability.

Preferably, said Petri net comprises: at least 10 Petri places and at least 10 Petri transitions, or, at least 100 Petri places and at least 100 Petri transitions, or, at least 1000 Petri places and at least 1000 Petri transitions.

Hence, the large scalability of the building method is improved.

Preferably, said built hybrid quantum-classical computing network comprises an orchestrator which is adapted and specifically dedicated to managing the built hybrid quantum-classical computing network workflow.

Hence, with an orchestrator optimally adapted to the network workflow, the network works even better.

In a first option, said built hybrid quantum-classical computing network workflow is asynchronous, said orchestrator is specifically dedicated to managing said asynchronous workflow.

In a second option, said built hybrid quantum-classical computing network workflow is synchronous, said orchestrator is specifically dedicated to managing said synchronous workflow.

Preferably, said connection simply transmitting without processing nor converting, transmits with delay either by putting jobs into their job queue or by putting results into their result queue, all job queues and all result queues of all connections being managed by a same orchestrator within the network.

Hence, the global efficiency of the working network is improved. Besides, implementing such a global orchestrator is made easier because of the specific intermediate supplementary Petri transformation step of the building method according to embodiments of the invention.

Preferably, said orchestrator manages: at least 10 job queues and/or at least 10 result queues, or, at least 100 job queues and/or at least 100 result queues, or, at least 1000 job queues and/or at least 1000 result queues.

Hence, the large scalability of the building method is improved.

Preferably, said Petri net comprises at least one or several bricks each comprising: a first type building block, a second type building block, said first type building block and said second type building block being interconnected together by an interface formatted so as to make any interconnected building block interchangeable with any replacing building block of different structure provided that said replacing building block has same format(s), as the interconnected building block it replaces, at each of its input(s) and output(s) belonging to said interface.

Hence, such very useful brick, which would otherwise be difficult to implement with prior art building methods, here becomes easier to implement with the building method according to embodiments of the invention, because of the specific intermediate supplementary Petri transformation step it includes.

Preferably, said Petri net comprises at least one or several bricks each comprising: a first type building block, corresponding to an analog quantum processing unit which processes a job received on an input port of said unit into a result sent on an output port of said unit, a second type building block, corresponding to a plugin unit which converts a digital job received on an input port of said unit, under the format of a quantum circuit made of quantum gates, into another analog job sent on an output port of said unit, under the format of a schedule made of Hamiltonians.

Hence, such very useful brick, which would otherwise be difficult to implement with prior art building methods, here becomes easier to implement with the building method according to embodiments of the invention, because of the specific intermediate supplementary Petri transformation step it includes.

Preferably, said Petri net comprises at least one or several bricks each comprising: a first type building block, corresponding to a digital quantum processing unit which processes a job received on an input port of said unit into a result sent on an output port of said unit, said digital quantum processing units belonging to one or more technologies of qubits, a second type building block, corresponding to a plugin unit which is a classical central processing unit (CPU).

Hence, such very useful brick, which would otherwise be difficult to implement with prior art building methods, here becomes easier to implement with the building method according to embodiments of the invention, because of the specific intermediate supplementary Petri transformation step it includes.

Preferably, said Petri net comprises: at least 10 of said bricks, or, at least 100 of said bricks, or, at least 1000 of said bricks.

Hence, the large scalability of the building method is improved.

Preferably, said hybrid quantum-classical computing network includes at least one or more interactions of the type client server interactions, with said server being located in a cloud.

Hence, the flexibility of the network obtained by running the network building method according to embodiments of the invention is improved.

Preferably, said hybrid quantum-classical computing network corresponds to a high performance cluster (HPC) which includes at least 100 calculation nodes, or at least 1000 calculation nodes, or at least 5000 calculation nodes.

Hence, the large scalability of the building method is improved.

Further features and advantages of the invention will appear from the following description of embodiments of the invention, given as non-limiting examples, with reference to the accompanying drawings listed hereunder.

DETAILED DESCRIPTION OF THE INVENTION

An application is composed of services, and a service may be composed of one or more methods, each input of each method being uniquely, at the service level, labeled by a port. Additionally, each method will label its outputs using output ports, with the constraint that to each output port corresponds a unique type.

For instance, for a service with the following signature:
Service FOO:
foo (a: A, b: B)→(c: C, d: D)
bar (e: E)→(c: C, f: F)

For this service to fit in the framework, each possible input will be associated to a unique port and each output to another port. This gives, for instance:

foo (1/a: A, 2/b: B)→(1/c: C, 2/d: D)
bar (3/e: E)→(1/c: C, 3/f: F)
it can be seen that:
each possible input receives a different port,
output ports are not necessarily unique: the output c of type C or both methods have the same port: there is no problem with that since they both correspond to outputs with the same type.

Once each service composing the application have been associated to its port, by using this port system, description can be made about how they relate to one another by creating relations between output ports and input ports of two services.

Considering the two following services:
Service A:
f (1/u: U)→(1/v: V)
Service B:
g (1/v: V)→(1/w: W)

The method of service A is called, and then its output is redirected to the input of the method of service B. Because of the use of the ports, this behavior can be easily described as connecting the output port 1 of the first method to input port 1 of the second method. Since these two ports correspond to the same data type, this will be a valid composition and the resulting application is well defined.

Hence, an application will consist of:
a collection of services associated to ports,
a collection of connections linking output ports to input ports with the same type.
Such an application can be represented by a graph whose vertices are services and edges are connections between ports.

Figure 1:
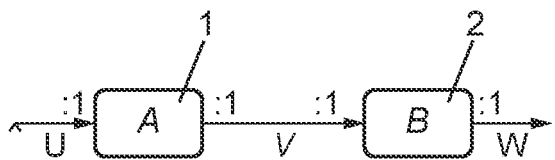
FIG. 1 shows an example of a Petri net transformation step for a connection between two different services.

For instance the previous connection of service A and B can be represented by the graph represented on FIG. 1.

FIG. 1 shows an example of a Petri net transformation step for a connection between two different services.

Inputs, outputs, and connections between two services, service 1 and service 2, are represented. Here, service 1 and service 2 each have one input and one output. The output of service 1 is connected to the input of service 2.

Conversely, such a graph captures exactly the information flow of an application. Considering for instance the graph represented on FIG. 2.

Figure 2:
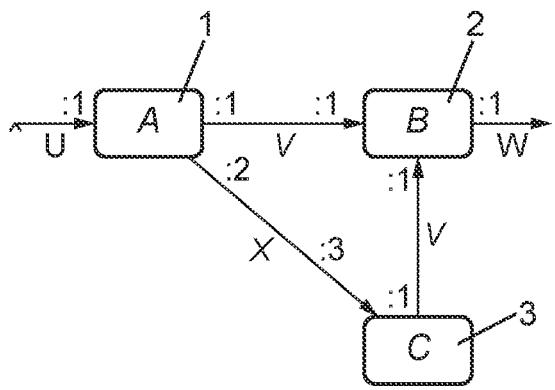
FIG. 2 shows an example of a Petri net transformation step for three different services interconnected together.

FIG. 2 shows an example of a Petri net transformation step for three different services interconnected together.

Inputs, outputs, and connections between two services, service 1 and service 2 and service 3, are represented. Here, service 2 and service 3 each have one input and one output. Here, service 1 has one input and two outputs. One of the outputs of service 1 is connected to the input of service 2. The other one of the outputs of service 1 is connected to the input of service 3.

This graph shows that service 1 has a method of type 1|U→(1|V, 2|X), service 2 has a method 1|V→1|W, and service 3 has a method 3|X→1|V.

Now, the mechanisms by which these applications are run will be described.

Each individual service composing the application comprises either simple memory-less methods, proper daemon services, or objects with a public interface. Deploying such services will require different types of work:
memory-less methods and objects will have to be dynamically loaded in memory,
daemon services may be started, and a client connection will be established; here, no specific technical assumption is made about the starting process or the protocol used to communicate with the services.

Once this deployment is finished, a main process is started. This main process will be in charge of keeping track of the presence of data travelling between the different services.

Figure 3:
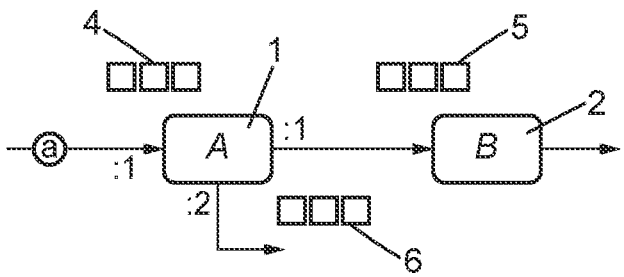
FIG. 3 shows an example of a Petri net transformation step for a connection between two different services, implementing queues managed by a common orchestrator, showing a first step of queues management by orchestrator.

FIG. 3 shows an example of a Petri net transformation step for a connection between two different services, implementing queues managed by a common orchestrator, showing a first step of queues management by orchestrator.

Inputs, outputs, and connections between two services, service 1 and service 2, are represented. Here, service 2 has one input and one output. At the input of service 2, there is an inputs queue 5. Here, service 1 has one input and two outputs, a first output on output port 1 and a second output on output port 2. At the input of service 1, there is an inputs queue 4. First output of service 1 is connected to the input of service 2, and indeed to the inputs queue 5 of service 2. Second output of service 1 is here not yet connected to the input of another service and is sent on its outputs queue 6. An input a is submitted to the application on input of service 1 (on input port 1 of service 1).

Figure 4:
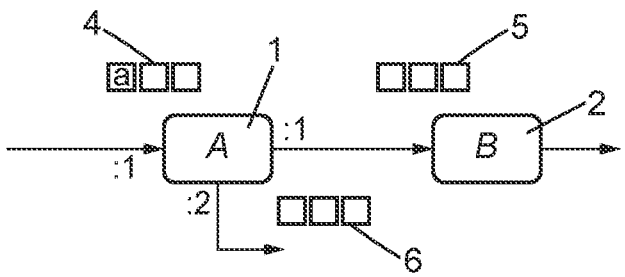
FIG. 4 shows an example of a Petri net transformation step for a connection between two different services, implementing queues managed by a common orchestrator, showing a second step of queues management by orchestrator.

FIG. 4 shows an example of a Petri net transformation step for a connection between two different services, implementing queues managed by a common orchestrator, showing a second step of queues management by orchestrator.

The input a is pushed by the main process onto the inputs queue 4 attached to input port 1 of service 1.

Figure 5:
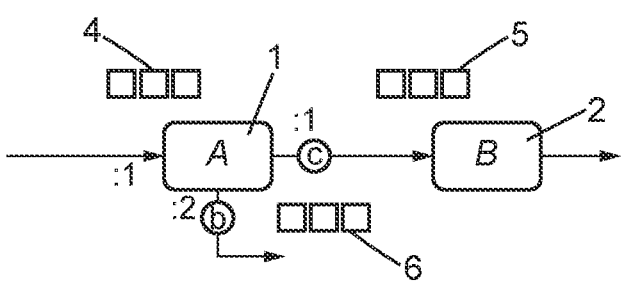
FIG. 5 shows an example of a Petri net transformation step for a connection between two different services, implementing queues managed by a common orchestrator, showing a third step of queues management by orchestrator.

FIG. 5 shows an example of a Petri net transformation step for a connection between two different services, implementing queues managed by a common orchestrator, showing a third step of queues management by orchestrator.

Service 1 is called and produces two outputs, first output and second output, one on each of the two existing output ports of service 1, respectively on port 1 of service 1 and on port 2 of service 1.

Figure 6:
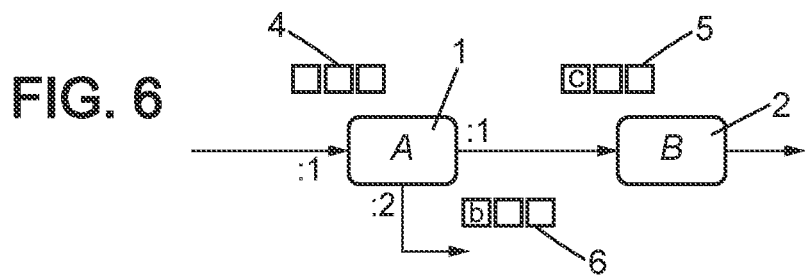
FIG. 6 shows an example of a Petri net transformation step for a connection between two different services, implementing queues managed by a common orchestrator, showing a fourth step of queues management by orchestrator.

FIG. 6 shows an example of a Petri net transformation step for a connection between two different services, implementing queues managed by a common orchestrator, showing a fourth step of queues management by orchestrator.

The main process pushes the value c which is sent on first output (output port 1 of service 1) onto inputs queue 5 of service 2, whereas value b which is sent on second output (output port 2 of service 1) is pushed directly onto outputs queue 6 of service 1 since output port 2 is not or not yet connected to any other service.

All along FIGS. 3 to 6, the behavior of main process may be summarized as follows:
originally, the main process will attach to each input port of each service an inputs queue,
when a data is sent to a service on some input port, the main process will push the data onto the corresponding inputs queue,
if upon pushing this data, all the inputs queues corresponding to a method of a service are non-empty, the main process will pull a value from each of the inputs queues and call the corresponding method of the service,
upon receiving the output values of the method, it will use the application description to route the output values to corresponding input ports of other services. If an output port of a service is not connected to any input of any other service, it will push it to a particular outputs queue.

In practice, this flow management can be implemented using several alternatives.

The two main alternatives are to consider:
either a synchronous flow where each call to a service method is blocking, or an asynchronous model where services are threaded and are individually responsible for pulling values out of their input queues.

While the second alternative has a larger overhead, it allows for different methods to be called concurrently and thus it fully makes use of the underlying platform. Of course, it is expected that the services will take some time to process data. However, this entails that the time spent routing information will be negligible when compared to the time spent calling the services methods. Thus, in this setting, a threaded alternative can be still considered as being a reasonable alternative.

Regarding communication between the main thread (and the inputs/outputs queues) and the services, it is possible:
either to use inter-thread channels such as MPSC channels,
or to use system sockets with an appropriate protocol to send data to the service daemon.

The later solution will be more suitable to large scale applications where services are managed at the system level and where application simply create connections to these services.

Description is now made of some provided examples showing what a service declaration can look like in python software language.

The following piece of code declares a service with the same signature as the service 'foo' described previously.
class ServiceFOO(metaclass.Service):
  @ports(inputs=[1, 2], outputs=[1, 2])
  def foo(self, a: A, b: B)→(C, D):
  # here goes the implementation of foo
  return (c, d))
  @ports(inputs=[3], outputs=[1, 3])
  def baz(self, e: E)→(C, F):
  # here goes the implementation of baz
  return (c, f)

Once all services have been declared, it can be composed inside a new object called an application that more or less stores the connection graph between the ports:
  my_application=Application( )
  my_application.add_service(Foo, "FOO", foo_arg1, foo_arg2, . . . )
  my_application.add_service(Bar, "BAR", bar_arg1, bar_arg2, . . . )
  my_application.connect("FOO", 3, 2, "BAR")

Here the application has been declared with two services. The services are specified by their class, by a key, and by a collection of constructor arguments. Connections between ports are then added via a "connect" method. Hence, the end result of this piece of code is an application that can be described, when omitting stray input and output connections, by the graph represented on FIG. 7.

Figure 7:
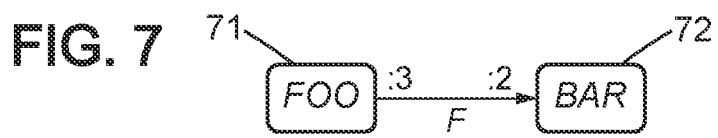
FIG. 7 shows another example of a Petri net transformation step for a connection between two different services.

FIG. 7 shows another example of a Petri net transformation step for a connection between two different services.

The third output of service 71 is connected to the second input of service 72.

Once the application is described, its static description can be sent to the target machine and the services are instantiated, together with the inputs and outputs queues for each port. A "main thread" will be in charge of moving values in between queues.

Some use cases will be given as illustrating examples below.

In the framework developed in the present description, the following assumption is made about any call to a quantum resource/co-processor, that each call takes the form of a collection of atomic pieces of quantum computations called "jobs".

These computations are described using:
a specification of a quantum evolution that the quantum memory should undergo,
a specification of a final measurement that will consume the quantum memory to produce a classical result.

The specification of the quantum evolution can take form of a gate-based quantum program (or quantum circuit) in the case of a digital computation, or a time-dependent Hamiltonian (dubbed "schedule") in the case of an analog computation.

However, this list is not exhaustive, and there can be other processes such as hybrid ones, when these processes allow to prepare the desired quantum state. The specification of the final measurement can take form of a number of shots, dictating how many times the experiment should be reproduced, or a more complicated task, such as the sampling of a collection of observables. Such a job can be evaluated by a quantum coprocessor and can result in a collection of samples and statistics. In this framework, these collections will be called "results". In a nutshell, a result is simply the output of the evaluation of a job.

The architecture allows to define two basic building blocks that can be used to construct a quantum software stack:

Quantum Processing Units (QPUs) which are processes that accept jobs and return results. They basically correspond to quantum hardware platforms (or dressed versions thereof), Plugin Units which are processes that convert job(s) into job(s), and/or result(s) into result(s). They encompass for instance: compilers, error mitigators, variational optimizers.

Figure 8:
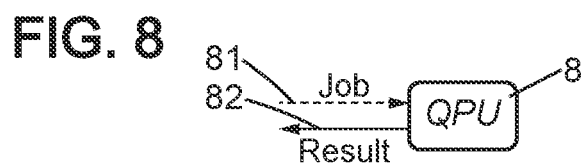
FIG. 8 shows an example of a first type of building block used during the Petri net transformation step, within the building method according to embodiments of the invention.
Figure 9:
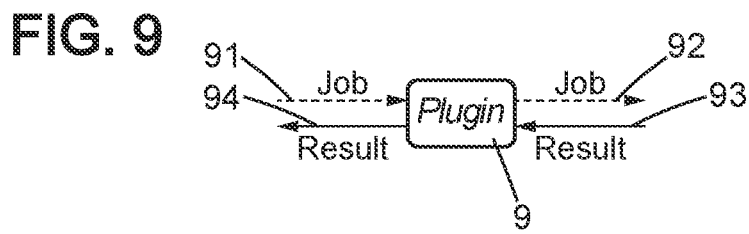
FIG. 9 shows an example of a second type of building block used during the Petri net transformation step, within the building method according to embodiments of the invention.

These two processes are illustrated respectively on FIG. 8 and on FIG. 9.

FIG. 8 shows an example of a first type of building block used during the Petri net transformation step, within the building method according to embodiments of the invention.

A first type of Petri place corresponds to a first type building block corresponding to any quantum processing unit 8, said quantum processing unit 8 including quantum processing hardware and quantum processing software, either digital or analog quantum processing unit 8, which processes a job received on an input port 81 of this unit 8 into a result sent on an output port 82 of this unit 8.

FIG. 9 shows an example of a second type of building block used during the Petri net transformation step, within the building method according to embodiments of the invention.

A second type of Petri place corresponds to a second type building block corresponding to any plugin unit 9, said plugin unit 9 including plugin hardware and plugin software, which converts a job received on an input port 91 of this unit 9 into another job sent on an output port 92 of this unit 9 and/or a result received on another input port 93 of this unit 9 into another result sent on another output port 95 of this unit 9.

Typically, plugin unit 9 can be composed with one another if several pre-processing steps or post-processing steps are required. The composition of a QPU 8 with a Plugin unit 9 behaves as a QPU and is therefore considered as a QPU (albeit enhanced by the functionalities brought by the plugin unit 9 of course). Indeed, such a combination is a process that takes a job as an input and returns a result as an output.

Some digital use cases will be given as illustrating examples below, that are enabled by the architecture described above.

An example can be circuit compilation.

Circuit compilation consists in modifying the form of quantum programs to take into account some specific constraints, while keeping the task at hand equivalent to the initial one. Compilation may consist in rewriting a quantum circuit C into another circuit e that complies with the available set of gates (using a limited number of gate types) of a given processor. For instance, trapped-ion platforms typically do not accept standard CNOT gates. These gates need to be replaced by native trapped-ion gates. Compilation may consist in rewriting a quantum circuit to fulfill the connectivity constraints of a given hardware. For instance, qubits in superconducting processors can only be addressed by two-qubit gates if they are neighbors in the two-dimensional grid layout of the qubits. This means that quantum circuits that contain two-qubit gates that involve non-neighboring qubits need to be rewritten.

Figure 10:
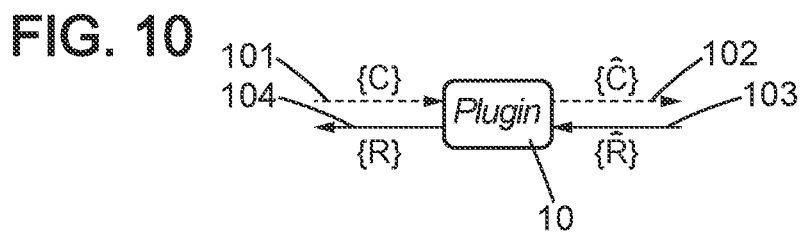
FIG. 10 shows an example of a second type of building block, corresponding to a first given service of an application, used during the Petri net transformation step, within the building method according to embodiments of the invention.

All these use cases are covered by a Plugin type of process as represented on FIG. 10.

FIG. 10 shows an example of a second type of building block, corresponding to a first given service of an application, used during the Petri net transformation step, within the building method according to embodiments of the invention.

The Plugin unit 10 receives a job on its job input 101 and sends a job on its job output 102. The Plugin unit 10 receives a result on its result input 103 and sends a result on its result output 104. $\mathcal{C}$ is the input circuit received on its job input 101, $\tilde{c}$ is the output (optimized) circuit sent on its job output 102. The input result, $\tilde{\mathcal{R}}$ received on its result input 103, may need to be postprocessed into a modified result, $\mathcal{R}$ sent on its result output 104. For instance, the qubit indices of the circuit may be permuted when transforming $\mathcal{C}$ to $\tilde{c}$, and have thus be permuted back in going from $\tilde{\mathcal{R}}$ to $\mathcal{R}$ so that the compilation is transparent to the user.

Another example can generic observable measurement.

Part of actual Quantum Processing Units (QPUs) are designed to perform only very simple measurements on the final quantum state which will be denoted by its ket notation, $|\Psi\rangle$. These measurements are most of the time so-called "Z-axis measurements", namely they aim at measuring the average value:

$$\langle Z_q \rangle = \langle \Psi | \hat{Z}_q | \Psi \rangle,$$

where q denotes the qubit index and Z the z-Pauli observable. The physical way to obtain $\langle Z_q \rangle$ is dependent of the architecture used therefore. It requires several preparations of state $|\Psi\rangle$ because quantum measurement of any observable $\hat{O}$ projects the state in an eigenvector $|\phi_\alpha\rangle$ of $\hat{O}$ with a probability $p_\alpha = |\langle \phi_\alpha | \Psi \rangle|^2$. Therefore, for $\hat{Z}$, each measurement $i=1 \ldots N_{shots}$ projects to the eigenvectors $|0\rangle$ and $|1\rangle$ of $\hat{Z}$ and yields a value $z_i=1$ or $-1$, respectively. The expectation value $\langle Z_q \rangle$ is estimated by averaging over these repetitions:

$$\bar{Z}_q = \frac{1}{N_{shots}} \sum_{i=1}^{N_{shots}} z_i^q,$$

with a (squared) statistical standard error:

$$\Delta Z_q^2 = \langle (\bar{Z}_q - \langle Z_q \rangle)^2 \rangle \approx \frac{\sigma^2(z^q)}{N_{shots} - 1}$$

with $\sigma^2(z^q) = \frac{1}{N_{shots}} \sum_{i=1}^{N_{shots}} (z_i^q - \bar{Z}_q)^2$.

This description can be extended to a multi-qubit version $\hat{Z}_{q_1}, \hat{Z}_{q_2} \ldots \hat{Z}_{q_m}$ by replacing $\bar{Z}_q$ by:

$$\overline{Z_{q_1} Z_{q_2} \ldots Z_{q_m}} = \frac{1}{N_{shots}} \sum_{i=1}^{N_{shots}} z_i^{q_1} z_i^{q_2} \ldots z_i^{q_m}.$$

Available QPUs thus only yield expectations values of observables of the form $\hat{Z}_{q_1}, \hat{Z}_{q_2} \ldots \hat{Z}_{q_m}$. Yet, many applications like quantum chemistry or condensed-matter physics require the computation of expectation values of any Hermitian operator $\hat{O}$. Such observables will be decomposed as:

$$\hat{O} = \sum_{k=1}^{M} \lambda_k \hat{P}_k,$$

where $\lambda_k \in \mathbb{R}$ and $\hat{P}_k$ is a product of $m_k$ Pauli operators, $$\hat{P}_k = \hat{\sigma}_{q_1}^{i_1} \hat{\sigma}_{q_2}^{i_2} \ldots \hat{\sigma}_{q_{m_k}}^{i_{m_k}},$$

with $i \in \{x, y, z\}$. By convention, it will be denoted $\hat{X} = \hat{\sigma}^x$ and so forth.

QPUs should thus be able to compute any expectation value of the form $$\langle \hat{\sigma}_{q_1}^{i_1} \hat{\sigma}_{q_2}^{i_2} \ldots \hat{\sigma}_{q_{m_k}}^{i_{m_k}} \rangle.$$

Hence, products with X or Y operators are a priori excluded because QPUs only support measurements of products of $\hat{Z}$ operators. To put aside this restriction, use is made of the fact that g and Y can be rewritten as:

$$\hat{X} = U_X^\dagger \hat{Z} U_X$$

$$\hat{Y} = U_Y^\dagger \hat{Y} U_Y$$

Hence, measuring $\hat{X}$ on state $|\Psi\rangle$ is equivalent to measuring $\hat{Z}$ on state $U_X |\Psi\rangle$. The raw QPU can thus be used to measure $\langle \hat{X} \rangle$ by being fed a job with the original circuit appended with a $U_X$ gate.

One ends up with the following algorithm: for each term $\hat{P}_k$ of the decomposition of the observable $\hat{O}$ to be measured, one has to:

append relevant gates to the original circuit (depending on the Pauli terms contained in $\hat{P}_k$), send a job to measure $\hat{P}_k^Z = \hat{Z}_{q_1} \hat{Z}_{q_2} \ldots \hat{Z}_{q_m}$ on this modified circuit, recover the resulting average value $\langle \hat{Z}_{q_1} \hat{Z}_{q_2} \ldots \hat{Z}_{q_m} \rangle$, and then compute the final average value of the observable as:

$$\langle \hat{O} \rangle = \sum_{k=1}^{M} \lambda_k \langle \hat{P}_k \rangle.$$

This algorithmic task is very easily implementable via the architecture proposed by embodiments of the invention. This is handled by a process of the Plugin type as shown on FIG. 11.

Figure 11:
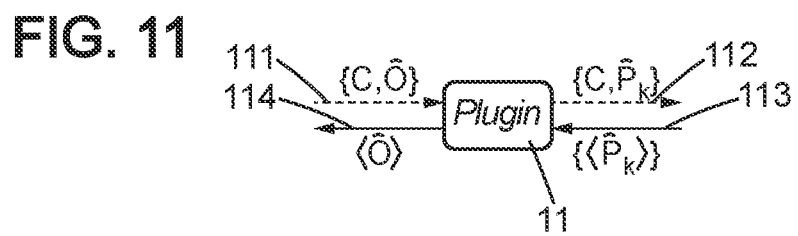
FIG. 11 shows an example of a second type of building block, corresponding to a second given service of an application, used during the Petri net transformation step, within the building method according to embodiments of the invention.

FIG. 11 shows an example of a second type of building block, corresponding to a second given service of an application, used during the Petri net transformation step, within the building method according to embodiments of the invention.

The Plugin unit 11 receives a job on its job input 111 and sends a job on its job output 112. The Plugin unit 11 receives a result on its result input 113 and sends a result on its result output 114. On job input 111, represented by an incoming dashed line, is received the original Job ($\mathcal{C}$, $\hat{O}$), which asks for a measurement of $\hat{O}$ on the final state $|\Psi\rangle = U\mathcal{C}|0\rangle^{\otimes n}$ after execution of circuit $\mathcal{C}$. On job output 112, represented by an outcoming dashed line, is sent a list of Jobs {($\mathcal{C} \cup \mathcal{C}_k$, $\hat{P}_{k_z}$), k=1 ... M}, where $\mathcal{C}_k$ corresponds to the gates needed to transform to the Z-basis. On result input 113, represented by an incoming solid line, is received a list of M results containing the values $\langle \hat{Z}_{q1}\hat{Z}_{q2} \ldots Z_{qm} \rangle$. The plugin unit 11 sums them up to $\langle \hat{O} \rangle$ as in the following equation:

$$\langle \hat{O} \rangle = \sum_{k=1}^{M} \lambda_k \langle \hat{P}_k \rangle.$$

It returns this value on result output 114, represented by an outcoming solid line.

Because of the composition property of the architecture proposed by embodiments of the invention, the combination of this plugin unit 11 with a raw QPU is itself a QPU with enhanced properties, namely a QPU that can handle the measurement of any observable.

Besides, this architecture allows to improve this basic behavior with more sophisticated algorithms (Crawford et al. 2021; Gokhale et al. 2019; Yen, Verteletskyi, and Izmaylov 2019) that aim at reducing the number of measurement jobs sent to the raw QPU, or at minimizing the overall number of shots needed for this estimation. For instance, the first improvement can be realized by finding partitions of the $\hat{P}_k$ operators in commuting terms, so that all the operators of the group can be measured in one go (i.e without repreparing the quantum state). The second improvement can be performed by choosing the number of shots (and hence the statistical error, to be proportional to the $\lambda_k$ coefficient. What this architecture proposes is a clean separation between these improvements, which can be done at the level of the plugin unit 11, optional other improvements, such as the compilation step mentioned previously, or other optimizations, and what happens at the QPU level.

Another example can be basic quantum eigensolver.

The Variational Quantum Eigensolver (VQE, (Peruzzo et al. 2014)) is the main algorithm suited for so-called Noisy Intermediate-Scale Quantum (NISQ) computers. Given a circuit $\mathcal{C}(\vec{\theta})$ parametrized by a list of parameters $\vec{\theta}$ (usually the angles of rotation gates) and an observable $\hat{O}$, VQE seeks to minimize the expectation value $O(\vec{\theta}) = \langle \Psi(\vec{\theta}) | \hat{O} | \Psi(\vec{\theta}) \rangle$ using a classical minimization algorithm. The QPU is used to compute $O(\vec{\theta})$ for a given assignment of the parameters. This hybrid quantum classical algorithm can be described seamlessly in the architecture proposed by embodiments of the invention, by using the following two processes represented on FIG. 12.

Figure 12:
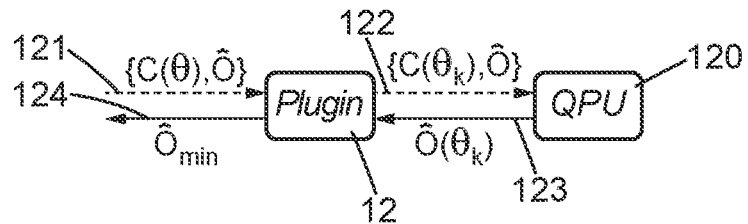
FIG. 12 shows an example of a first type of brick, including both examples of a first type of building block and of a second type of building block, used during the Petri net transformation step, within the building method according to embodiments of the invention.

FIG. 12 shows an example of a first type of brick, including both examples of a first type of building block and of a second type of building block, used during the Petri net transformation step, within the building method according to embodiments of the invention.

There is a brick comprising a plugin unit 12 associated with a quantum processing unit 120.

The Plugin unit 12 receives a job on its job input 121 and sends a job on its job output 122. The Plugin unit 12 receives a result on its result input 123 and sends a result on its result output 124.

The quantum processing unit 120, which processes a job received on its input port 122 which is directly connected to job output 122 of plugin unit 12, and therefore represented with the same reference, into a result sent on its output port 123 which is directly connected to result output 123 of plugin unit 12, and therefore represented with the same reference.

The right-hand process is a QPU 120 with the capacity to measure any observable $\hat{O}$ for a given circuit $\mathcal{C}$ (this is not the case of every QPU, but any raw QPU not endowed with this property can be enhanced by using the plugin previously described. The left-hand process is a plugin unit 12 that accepts on its job input 121, represented by an incoming dashed line, parametric Jobs ($\mathcal{C}(\vec{\theta})$, $\hat{O}$), i.e where $\vec{\theta}$ is not set, and returns, on its result output 124, represented by an outgoing solid line, upon achieving a completion criterion defined below, the minimum value $O(\vec{\theta}^*)$. Using a classical optimization algorithm, the plugin unit 12 iteratively chooses new values of parameters, $\vec{\theta}_k$ to prepare jobs ($\mathcal{C}(\vec{\theta}_k)$, $\hat{O}$) sent on its job output 122, represented by an outgoing dashed line, whose return value $O(\vec{\theta}_k)$ received on its result input 123, represented by an ingoing solid line, is classically processed to make a decision, namely either to send out a new job ($\mathcal{C}(\vec{\theta}_{k+1})$, $\hat{O}$) on its job output 122 (if the criterion is not met), or return the final value $O(\vec{\theta}^*)$ with $\vec{\theta}^* = \vec{\theta}_k$. on its result output 124 (if the criterion is met).

The resulting global brick VQE QPU (by virtue of the composition property of the architecture, the assembly of both processes 12 and 120 is itself a QPU) can henceforth handle any parametric job and will minimize the value of the observable over the parametric circuit it is fed. It can be composed with other plugin units that can handle parametric circuits, such as, for instance, compilation plugin units handling parametric circuit.

Another example can be variational quantum eigensolver.

The power of the architecture proposed by embodiments of the invention completely unfolds when the VQE method described previously is made even more sophisticated. Now, are presented two advanced improvements that can readily be implemented using this architecture: the gradient-based optimizer and the adaptive ansatz construction.

First, is now described the gradient-based optimizer.

The VQE method relies on a classical optimization algorithm that aims at minimizing the value $O(\vec{\theta}) = \langle \Psi(\vec{\theta}) | \hat{O} | \Psi(\vec{\theta}) \rangle$. Previously, assumption was made that this optimization algorithm required only an access to $O(\vec{\theta})$ for any value of $\vec{\theta}$. However, some optimization routines benefit from having access to the gradient of the function $O(\vec{\theta})$ to be minimized. This usually yields better convergence towards the minimum, at the cost of extra function evaluations. In the VQE context, using such gradient-based minimizers requires the computation of $\nabla O(\vec{\theta})$. It turns out that the P values corresponding to this gradient (assuming $\vec{\theta}$ is a P-component vector) can be expressed as a function of expectation values over a modified quantum circuit (with a possibly modified observable):

$$\nabla_p O(\vec{\theta}) = f(\langle \psi_p(\vec{\theta}) | \hat{O}_p | \Phi_p(\vec{\theta}) \rangle), \forall p=1 \ldots P$$

where the function $f$, state $\Phi_p$ and observable $\hat{O}_p$ may vary from one method to the other: the two main variants being the so-called parameter-shift rule (Mitarai et al. 2018) and the Hadamard test (Romero et al. 2018) method. Thus, gradient-based methods merely require the execution of additional quantum jobs $(\mathcal{C}_p(\vec{\theta}), \hat{O}_p)$. Thus, for each gradient based VQE iteration (labeled by index k, see above), instead of producing a unique $(\mathcal{C}(\vec{\theta}_k), \hat{O})$ Job, the plugin unit is going to produce a list of jobs:

$$\{(\mathcal{C}(\vec{\theta}_k), \hat{O})\} \cup \{(\mathcal{C}_p(\vec{\theta}_k), \hat{O}_p), p=1 \ldots P\}.$$

The Output Results $$\{O(\vec{\theta}_k)\} \cup \{O_p(\vec{\theta}_k), p=1 \ldots P\}.$$

will then be combined to input the function value $O(\vec{\theta}_k)$ and its gradient $\nabla_p O(\vec{\theta}_k)$ to the classical minimizer to decide on the next parameter assignment $\vec{\theta}_{k+1}$.

Figure 13:
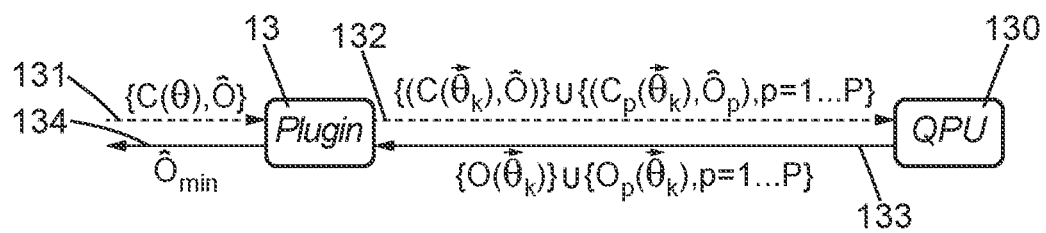
FIG. 13 shows an example of a second type of brick, including both examples of a first type of building block and of a second type of building block, used during the Petri net transformation step, within the building method according to embodiments of the invention.

FIG. 13 shows an example of a second type of brick, including both examples of a first type of building block and of a second type of building block, used during the Petri net transformation step, within the building method according to embodiments of the invention.

There is a similar brick as the brick shown in FIG. 12. Indeed, there is a brick comprising a plugin unit 13 associated with a quantum processing unit 130.

The Plugin unit 13 receives a job on its job input 131 and sends a job on its job output 132. The Plugin unit 13 receives a result on its result input 133 and sends a result on its result output 134.

The quantum processing unit 130, which processes a job received on its input port 132 which is directly connected to job output 132 of plugin unit 13, and therefore represented with the same reference, into a result sent on its output port 133 which is directly connected to result output 133 of plugin unit 13, and therefore represented with the same reference.

Even more sophisticated machine-learning inspired methods, that require the modification of the gradient to take into account the differential geometry of the variational subspace, merely result in the construction of additional jobs by the VQE plugin. The results of these jobs are then processed to compute the required correction to the gradient. For instance, for the so-called "natural-gradient" method (Stokes et al. 2020; Koczor and Benjamin 2019; Yamamoto 2019), additional jobs are used to construct the metric tensor of the variational subspace and then modify the gradient. By using this architecture proposed by embodiments of the invention, this very advanced method can be implemented in a limited number of lines of code.

Second, is now described the adaptative ansatz construction.

In the VQE method, a key ingredient is the choice of parametric circuit $\mathcal{C}(\vec{\theta})$. Depending on this choice, the minimization procedure may reach a good approximation to the true lowest eigenvalue of the observable $\hat{O}$ at hand, or not. This success (or lack thereof) is primarily determined by two contradictory constraints: the ansatz circuit needs to be as complex (and thus generically as deep) as possible to ensure that the variational search space is large enough to reach a good approximate ground state; at the same time, coherence constraints of NISQ processors dictate that this ansatz should be as short as possible so as not to suffer from decoherence (whether through gate errors or during idling periods). Since the decoherence properties of the QPU are usually not known with a high precision, the construction of the ansatz best adapted to a given processor and problem is therefore an a priori difficult task. Recently, proposals to construct this ansatz circuit in an adaptive fashion have been put forward (Grimsley et al. 2019). They consist in constructing the ansatz circuit in a stepwise fashion by selecting operators from a pool $\{\tau_k, k=1 \ldots \mathcal{P}\}$ to add gates of the form $U_k(\theta) = \exp(-i\theta\tau_k)$ to the circuit. At each step i, one chooses the $\tau_k$ operator which maximizes the value of the gradient:

$$\frac{\partial \langle O(\vec{\theta}^i, \vartheta_k) \rangle}{\partial \vartheta_k} \bigg|_{\vartheta_k=0} = -i \langle \Psi(\vec{\theta}^i) | [H, \tau_k] | \Psi(\vec{\theta}^i) \rangle$$

of the expectation value of the circuit where the associated $U_k(\theta_k)$ gate has been added. This seemingly complicated procedure would have a quite basic implementation by using the architecture proposed by embodiments of the invention:

the plugin unit receives a Job with an observable $\hat{O}$ to be minimized. The operator pool can be specified either in the job itself, or elsewhere.

at each step i,
  a first series of (non-parametric) jobs $\{(\mathcal{C}^{(i)}, -i[H, \tau_k]),$ $k=1 \ldots \mathcal{P}\}$ is sent out with set angles $\vec{\theta}^*$ from the previous step,
  its results are combined to compute the gradients as above (see FIG. 13), which are in turned used to select the optimal operator k* and grow the ansatz to $\mathcal{C}^{(i+1)} = \mathcal{C}^{(i)} \cup U_{k^*}$.
  a second parametric job $\{(\mathcal{C}^{(i+1)}(\vec{\theta}^{(i)} \cup \theta), H)\}$ is sent to optimize the angles.

Another example can be error mitigation.

State-of-the-art NISQ processors have error levels above the thresholds required by Quantum Error Correction theory. Nevertheless, methods (called error mitigation methods) have been proposed to mitigate the effect of errors of NISQ QPUs. These error mitigation techniques are all the most important as NISQ processors have high error rates. In this subsection, we show that our architecture enables a seamless integration of error mitigation methods within a hybrid quantum-classical stack.

We will focus on two concrete examples which are respectively zero-noise extrapolation and assignment probability error mitigation.

First, is now described the zero-noise extrapolation.

For a given NISQ QPU, r=1 is called its current noise level (r is any metric on the noise, normalized to 1 for the noise on the machine). The average value O of an observable $\hat{O}$ is to be computed after execution of a quantum circuit $\mathcal{C}$ characterized by the unitary operator $U_\mathcal{C}$. In the case of a perfect execution (i.e r=0), there is:

$$\langle O(r=0) \rangle = \langle \Psi | \hat{O} | \Psi \rangle$$

with $|\Psi\rangle = U_{\mathcal{C}}|0\rangle^{\otimes n}$. However, there is no direct access to the sought-after $\langle O(r=0)\rangle$ value because of the presence of noise, and the measured value is:

$$\langle O(r=1)\rangle = Tr[\hat{\rho}(r=1)\hat{O}]$$

where $\vec{\rho}$ (r=1) is the (mixed) final state of the system after a noisy evolution (the observable Ô is also affected by noise in general, but this dependence can be neglected for sake of simplicity). The zero-noise extrapolation technique proposes a way to extrapolate from $\langle O(r=1)\rangle$ to $\langle O(r=0)\rangle$ by artificially increasing the noise level to values $r_i$ such that $r < r_1 < r_2 \ldots$, measuring the corresponding observables $\langle O(r_i)\rangle$ and then performing an extrapolation to the r=0 limit. In practice, this artificial increase in the noise can be done in several ways. The most straightforward one would consist in adding identity operations with a variable duration in the original circuit so that the additional computational time required by the circuit leads to an increased sensitivity to decoherence. This insertion of identity operations can be easily implemented by adding pairs of involutive gates ($U^2=I$) like pairs of Hadamard gates or CNOT gates. This method would thus be easy to implement with a plugin unit that takes a regular (C, Ô) job as an input, and outputs a series of jobs:

$$\{(\mathcal{C}^{(i)}, i=0 \ldots N\hat{O})\},$$

where circuit $\mathcal{C}^{(i)}$ corresponds to the original circuit $\mathcal{C}$ with i pairs of involutive gates added at well-chosen places in the circuit (for instance after each two-qubit gate since they are the most error-prone gates). The corresponding observables $\{\langle O(r_i)\rangle, i=0 \ldots N\}$ are then used to extrapolate to the zero-noise limit to $\langle O(r=0)\rangle$, which is returned by the plugin unit.

Figure 14:
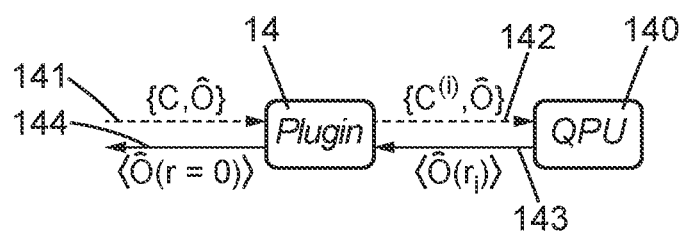
FIG. 14 shows an example of a third type of brick, including both examples of a first type of building block and of a second type of building block, used during the Petri net transformation step, within the building method according to embodiments of the invention.

FIG. 14 shows an example of a third type of brick, including both examples of a first type of building block and of a second type of building block, used during the Petri net transformation step, within the building method according to embodiments of the invention.

There is a similar brick as the bricks respectively shown in FIG. 12 and in FIG. 13. Indeed, there is a brick comprising a plugin unit 14 associated with a quantum processing unit 140.

The Plugin unit 14 receives a job on its job input 141 and sends a job on its job output 142. The Plugin unit 14 receives a result on its result input 143 and sends a result on its result output 144.

The quantum processing unit 140, which processes a job received on its input port 142 which is directly connected to job output 142 of plugin unit 14, and therefore represented with the same reference, into a result sent on its output port 143 which is directly connected to result output 143 of plugin unit 14, and therefore represented with the same reference.

Second is now described the assignment probability error mitigation.

NISQ QPUs are particularly prone to assignment errors during readout, namely there is a nonzero probability that a "0" bit is confused with a "1" (and conversely). Thus, for the single-qubit case, starting from a distribution $(p_0, p_i)$ for the probabilities of getting 0 or 1, assignment errors alter this distribution to $(\tilde{p}_0, \tilde{p}_1)$, with:

$$\begin{bmatrix} \tilde{p}(0) \\ \tilde{p}(1) \end{bmatrix} = \begin{bmatrix} p(0|0) & p(0|1) \\ p(1|0) & p(1|1) \end{bmatrix} \begin{bmatrix} p(0) \\ p(1) \end{bmatrix}$$

Thus, a noisy QPU with assignment errors will return $(\tilde{p}_0, \tilde{p}_1)$ instead of $(p_0, p_1)$ These errors can be mitigated if the so-called assignment error matrix:

$$A = \begin{bmatrix} p(0|0) & p(0|1) \\ p(1|0) & p(1|1) \end{bmatrix}$$

can be estimated. Then, the exact distribution may be recovered from the noisy one by:

$$\begin{bmatrix} p(0) \\ p(1) \end{bmatrix} = A^{-1} \begin{bmatrix} \tilde{p}(0) \\ \tilde{p}(1) \end{bmatrix}$$

This error mitigation technique, as the one used for instance in (Kandala et al. 2017), can easily be implemented with the architecture proposed by embodiments of the invention. A first series of jobs will serve the purpose of computing an estimate for A. This is done by sending circuits with X gates only and measuring the output probability, from which p(0|1) and p(1|1) can be inferred. With empty circuits, similarly, p(1|0) and p(0|0) can be estimated (this can be replicated for each qubit of the QPU). Then, the actual circuit that is input to the plugin, $\mathcal{C}$, can be executed as a job, and the final distribution returned as a result. Using the assignment probability matrix A computed previously and the above formula, the distribution corrected for assignment errors can be computed and returned.

Besides, some quantum processors do not support the digital operation mode, i.e. they cannot operate discrete gates on their qubits. Instead, they can be driven by continuous controls. This mode of operation is called analog quantum computing. Importantly, even digital machines are driven, internally, in an analog fashion.

The architecture proposed by embodiments of the invention allows to steer analog QPUs. In particular, its Job and Plugins processes (see above) are compatible with an analog operation mode. Even more, the architecture allows to seamlessly connect an analog operation mode to a digital one.

In the architecture proposed by embodiments of the invention, the flow of information between processes is either of type Job or of type Result. Both types Job and Result are compatible with an analog operation mode too.

The invention has been described with reference to preferred embodiments. However, many variations are possible within the scope of the invention.

What is claimed is:

1. A method of building a hybrid quantum-classical computing network, said network including network architecture and network workflow, comprising:
   transforming an application composed of services into a Petri net including both Petri places and Petri transitions between said Petri places,
   any said Petri place corresponding to:
   a first type building block corresponding to any quantum processing unit, said quantum processing unit including quantum processing hardware and quantum processing software, either digital or analog quantum processing unit, which processes a job received on an input port of said unit into a result sent on an output port of said unit; or
   a second type building block corresponding to any plugin unit, said plugin unit including plugin hardware and plugin software, which converts a job received on an input port of said unit into another job sent on an output port of said unit and/or a result received on another input port of said unit into another result sent on another output port of said unit, any Petri transition corresponding to any connection from an output port of any of said building blocks toward an input port of any other of said building blocks, each output port and input port being formatted so as to make any building block interchangeable with any replacing building block of different structure provided that said replacing building block has same one or more formats at each of its one or more inputs and one or more outputs as the building block it replaces;

transforming said Petri net into a hybrid quantum-classical computing network, by:

replacing any building block by its corresponding unit; and interconnecting all said corresponding units together according to a topography of all said Petri transitions, by replacing any Petri transition by a connection simply transmitting without processing nor converting, from an output port of any of said units toward an input port of any other of said units, thereby getting said hybrid quantum-classical computing network.

2. The method according to claim 1, wherein said second type building block corresponds to any plugin unit which converts a job received on an input port of said unit into another job sent on an output port of said unit and a result received on another input port of said unit into another result sent on another output port of said unit.

3. The method according to claim 1, wherein said Petri net comprises at least 10 Petri places and at least 10 Petri transitions.

4. The method according to claim 1, wherein said hybrid quantum-classical computing network comprises an orchestrator which is adapted and specifically dedicated to managing a workflow of said hybrid quantum-classical computing network.

5. The method according to claim 4, wherein said workflow of said hybrid quantum-classical computing network is asynchronous, and said orchestrator is specifically dedicated to managing said asynchronous workflow.

6. The method according to claim 4, wherein said workflow of said hybrid quantum-classical computing network is synchronous, and said orchestrator is specifically dedicated to managing said synchronous workflow.

7. The method according to claim 1, wherein said connection simply transmitting without processing nor converting, transmits with delay either by putting jobs into their job queue or by putting results into their result queue; and wherein all job queues and all result queues of all connections being managed by a same orchestrator within the network.

8. The method according to claim 7, wherein said orchestrator manages at least 10 job queues and/or at least 10 result queues.

9. The method according to claim 1, wherein said Petri net comprises at least one or several bricks each comprising:

a first type building block; and a second type building block;

said first type building block and said second type building block being interconnected together by an interface formatted so as to make any interconnected building block interchangeable with any replacing building block of different structure provided that said replacing building block has same one or more formats, as the interconnected building block it replaces, at each of its one or more inputs and one or more outputs belonging to said interface.

10. The method according to claim 9, wherein said Petri net comprises at least one or several bricks each comprising:

a first type building block, corresponding to an analog quantum processing unit which processes a job received on an input port of said unit into a result sent on an output port of said unit; and a second type building block, corresponding to a plugin unit which converts a digital job received on an input port of said unit, under the format of a quantum circuit made of quantum gates, into another analog job sent on an output port of said unit, under the format of a schedule made of Hamiltonians.

11. The method according to claim 9, wherein said Petri net comprises at least one or several bricks each comprising:

a first type building block, corresponding to a digital quantum processing unit which processes a job received on an input port of said unit into a result sent on an output port of said unit, said digital quantum processing units belonging to one or more technologies of qubits; and a second type building block, corresponding to a plugin unit which is a classical central processing unit (CPU).

12. The method according to claim 9, wherein said Petri net comprises at least 10 of said bricks.

13. The method according to claim 1, wherein said hybrid quantum-classical computing network includes at least one or more client interactions with a server, with said server being located in a cloud.

14. The method according to claim 1, wherein said hybrid quantum-classical computing network corresponds to a high performance cluster (HPC) which includes at least 100 calculation nodes.

* * * * *